S. A. KNOX.
Plow Moldboard.
No. 15,887. Patented Oct. 14, 1856.
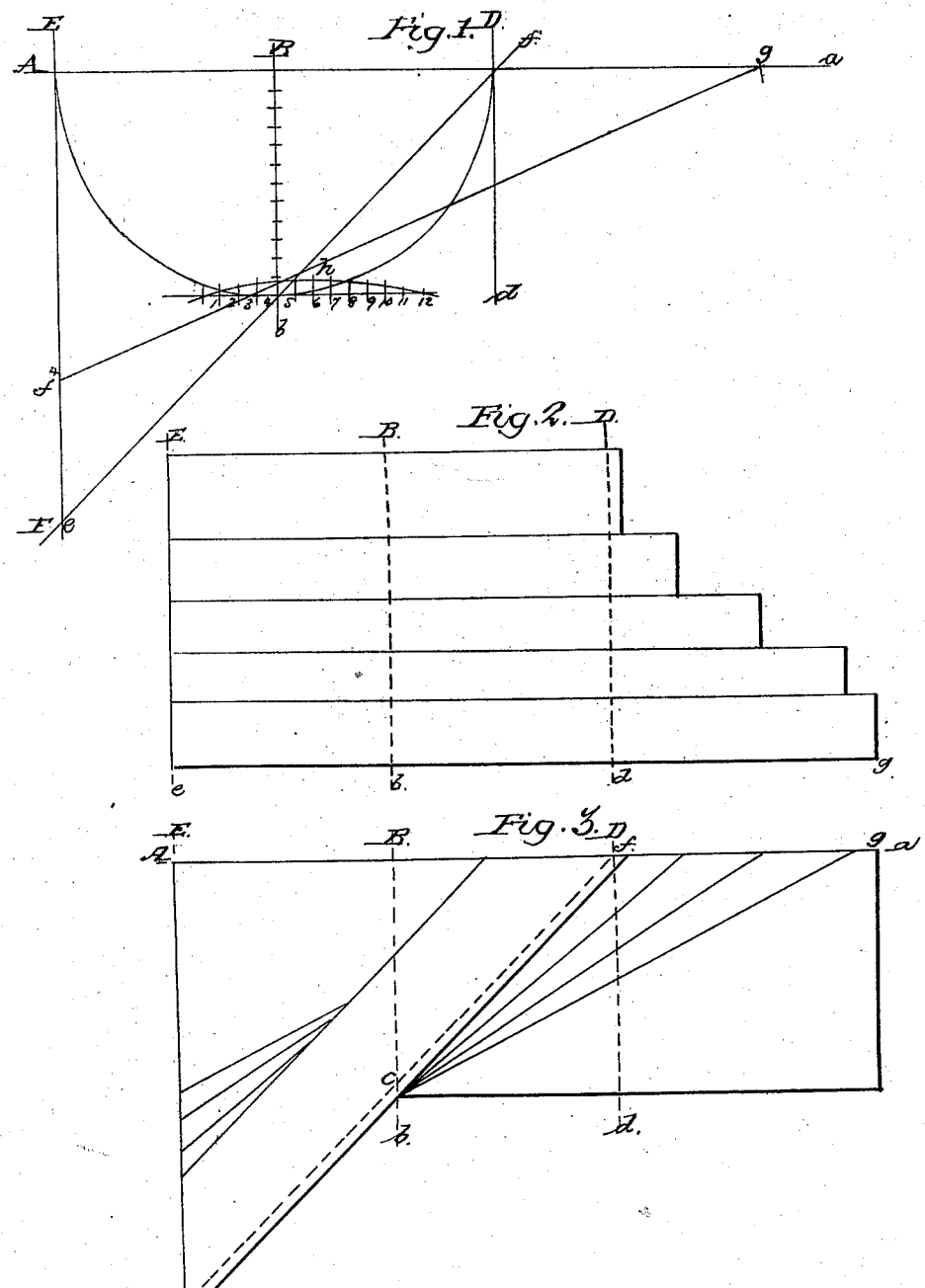

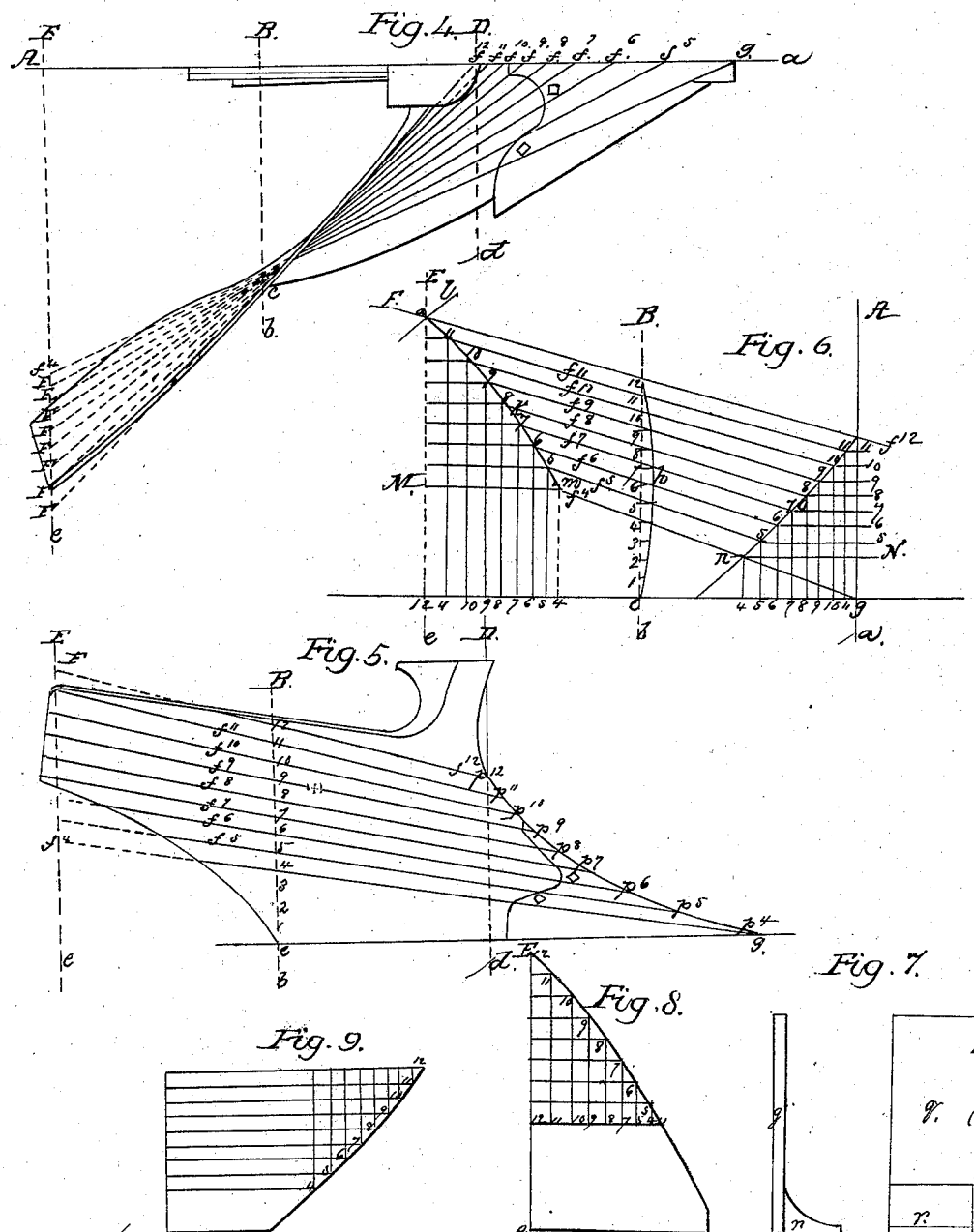
S. A. KNOX.
Plow Moldboard.
No. 15,887. Patented Oct. 14, 1856.

UNITED STATES PATENT OFFICE.

SAMUEL A. KNOX, OF WORCESTER, MASSACHUSETTS.

IMPROVEMENT IN PLOWS.

Specification forming part of Letters Patent No. 15,887, dated October 14, 1856.

*To all whom it may concern:*

Be it known that I, SAMUEL A. KNOX, of Worcester, in the State of Massachusetts, have invented a new and useful Improvement in the Method of Forming the Mold-Board of Plows; and I do hereby declare the following to be a full, clear, and exact description thereof, reference being had to the accompanying drawings, making part of this specification, in which—

Figure 1 is a diagram representing the mode of determining the proportions of the base of the plow; Fig. 2, an elevation of the block of wood prepared for being formed into a pattern for casting the mold-board, and Fig. 3 a plan thereof. Fig. 4 is a plan of the plow representing the longitudinal lines for determining the form of the mold-board and the inclination of the said lines to the landside projected on a horizontal plane; Fig. 5, an elevation of the face side of the mold-board, representing the inclination of the longitudinal lines to the base of the plow and projected on a vertical plane; Fig. 6, a diagram representing the three divisions of the mold-board as seen from the front of the plow; Fig. 7, an end and side view of a gage for determining the concavity of the mold-board at the second division; and Fig. 8, an elevation of a like gage for determining the concavity of the mold-board at the third division; and Fig. 9, an elevation of a like gage for determining the concavity at the first division.

The same letters indicate like parts in all the figures.

My said invention relates to the form of the face of the mold-board, which form presents certain characteristic features, however the proportions of the plow as to length and breadth may be varied, the mode of determining the figure of the working-surface being based on the proportions previously determined on the base by the nature of the soil for which the plow is intended.

To enable any one skilled in the art of plow-making to form the mold-board of plows according to my said invention, I will first describe the mode of determining the form of the surface of a pattern from which to mold and cast the mold-board of a greensward flat-furrow plow intended for a twelve-inch furrow, and I will then indicate the changes necessary to the production of the required form for an old-ground plow, from which any skillful plow-maker will be enabled to make the necessary changes for plows of any other dimensions.

For making the pattern from which to cast the mold-board of a greensward flat-furrow plow, I first determine the proportions of the base by drawing a line, A *a*, diagram Fig. 1, which represents the line of the landside, and at right angles to this I draw another line, B *b*, on which I determine the breadth of the base of the plow from the line of the landside to the heel *c* of the mold-board—say twelve inches for a furrow of that breadth—and this I divide into inches. I then draw two lines, D *d* and E *e* parallel with and one on each side of and at a distance of twelve inches from the line B *b*. I then draw a diagonal line, F *f*, from the intersection of the lines D *d* and A *a*, passing through the line B *b* at *c*, (the heel of the intended mold-board,) and project the said line until it intersects the line E *e* at *e*; and the plane of this line F *f*, perpendicular to the base at the required height, to be hereinafter specified, determines the inclination of the upper edge of the working-surface of the intended mold-board to the vertical plane of the line A *a* or landside. The distance of the point of the plow at *g* from the line B *b* is determined by multiplying the length of the diagonal line F *f* in inches from the point where it intersects the lines A *a* and D *d* to the point of its intersection with the line B *b* by an equal number of inches, and then dividing this product by the breadth of the intended plow at the heel *c* of the mold-board—say twelve inches—the product of which will be twenty-four inches and one-twelfth, ($24\frac{1}{12}$,) and add to this product one-tenth thereof, which will make the distance of the point from the line B *b*, twenty-six inches and fifty-nine one hundred and twentieths, ($26\frac{59}{120}$.)

Having determined the above proportions, I build up a block (represented at Figs. 2 and 3) from which to form the pattern, and consisting of a series of flat blocks of wood glued together to the required height in the usual manner of preparing blocks for making plow-patterns. The face A *a* of the said block is made perpendicular to the base and corresponds to the line A *a* or landside of diagram Fig. 1. The end E *e* presents a plane perpendicular to the base and at right angles to the face A *a*, and corresponding with the line E *e* of diagram Fig. 1, and the opposite end at *g* is cut to the required length for the location of the point of the plow. On the under side or face of this block I transfer the two lines B $b$ and D $d$, and the diagonal line F $f$ from diagram Fig. 1, as represented by dotted lines in Fig. 3; and I also mark on the face A $a$, and also on the opposite face of the said block-lines B $b$ and D $d$ to represent the planes of the said line perpendicular to the base, as represented by dotted lines in Fig. 2. I divide the block into three imaginary divisions by three imaginary planes perpendicular to the base, and corresponding with the three lines B $b$, D $d$, and E $e$, the first division being at the line D $d$, the second at the line B $b$, and passing through the heel of the intended mold-board, and the third at the line E $e$. I then draw a diagram, Fig. 6, with a base-line representing the base of the plow, on which I erect a perpendicular line, A $a$, corresponding with the landside or line A $a$, diagram Fig. 1, and parallel therewith and at a distance therefrom equal to the breadth of the plow at the heel of the mold-board. In this case twelve inches draw a line B $b$ corresponding with the line B $b$ on diagram Fig. 1, and from the base-mark on the said line twelve divisions of one inch each, numbered from 1 to 12; and I then strike the arc of a circle, $h$, on a radius of double the breadth of the intended plow at the heel of the mold-board, which in this case will be twenty-four inches, the said arc being made to intersect the line B $b$ at the base and at the twelfth division from the base, and then draw lines parallel with the base through each of the points of the twelve divisions to intersect or cut the said arc, the said lines being indicated by the figures numbering the several divisions on the line B $b$. The arc $h$ represents the concavity of the face of the intended mold-board at the second imaginary division; and the point of intersection of the said arc $h$ with the base is the position of the heel of the mold-board and marked $c$, and the point of its intersection with the division-line 12 determines the height of the line F $f$ of the upper edge of the working-surface of the mold-board and perpendiculary over the heel of the mold-board. On the said diagram Fig. 6 I draw another line, E $e$, parallel with the line B $b$, and at a distance therefrom equal to the breadth of the plow at the heel of the mold-board, and in this case twelve inches. I then draw a straight line, $gf^4$, from the point of intersection of the line A $a$ with the base to the point of intersection of the division-line 4 with the arc $h$ and project it beyond the arc $h$; but it becomes necessary to determine the height from the base at which this line $gf^4$ will intersect the plane of the third division. This I obtain on Fig. 5, which represents the lines on the face of the mold-board when projected on a plane perpendicular to the base. On this figure I draw the three parallel lines D $d$, B $b$, E $e$ perpendicular to the base, and, as in the other figures, indicating the first, second, and third divisions, and also the distance of the point $g$ of the plow from the second division. I transfer on the line B $b$ of this Fig. 5 from diagram Fig. 6 the several divisions numbered from 1 to 12 of the arc $h$ of Fig. 6, and I then draw a straight line from the point $g$ through the division numbered 4 and project it to the line E $e$ or plane of the third division, and this gives the inclination of the line $gf^4$ to the base, and hence the height of its intersection with the plane of the third division, and this height from the base I transfer to diagram Fig. 6, and draw through it a line, M $m$, parallel with the base until it intersects the line $gf^4$ on this diagram Fig. 6, and from this point of intersection I describe the arc of a circle, $l$, on a radius equal to the breadth of the plow at the heel of the mold-board, in this case twelve inches. I then describe an arc of a circle, $k$, on a radius of four times the breadth of the plow at the heel of the mold-board, and in this case forty-eight inches, making the said arc pass through the points of intersection of the arc $l$ with line E $e$ and line $gf^4$ with line M $m$. This arc of a circle, $k$, determines the concavity of the face of the mold-board at the plane of the third division, and the point of its intersection with the line E $e$ determines the height of the upper edge of the working-surface of the mold-board from the base; and having thus obtained this height, I transfer it onto the line E $e$, Fig. 5, and from this height I draw the diagonal line F $f^{12}$, intersecting the division 12 on the line B $b$ twelve inches from the base and project it to the front end of the plow. The inclination of this line to the base-line gives the inclination of the upper edge of the working-surface to the base of the plow, its inclination to the plane of the landside having been determined by the line F $f$ on diagram Fig. 1. The inclination of the line $gf^4$ to the plane of the base has already been determined, and to determine its inclination to the plane of the landside I delineate on diagram Fig. 1 the arc $h$ of Fig. 6, so that the chord of the arc shall be parallel with the line $a\,a$ and intersecting the line B $b$ at the point $c$ or heel of the mold-board, and so that the line of the division 4 shall coincide with the line B $b$, the convexity of the arc being toward the line A $a$. I then draw the diagonal line $gf^4$ from the point $g$ of the plow to the line E $e$ or third division and intersecting the line B $b$ at the point of its intersection with the arc $h$. The inclination of this line $gf^4$ to the plane of the landside, so determined on diagram Fig. 1, I transfer to Fig. 4, which represents a plan view of the mold-board with the lines projected on a horizontal plane, where it indicates the inclination of that part of the surface of the mold-board to the plane of the landside along the entire length of the mold-board, the inclination thereof to the base having already been defined and represented in Fig. 5.

Having in the manner above described defined and located the inclination of the surface of the mold-board to the plane of the base and the plane of the landside along the straight line $Ff^2$, or upper edge of the working-surface, and along the straight line $gf^4$, from the point of the plow to the third division, it becomes necessary to define the form at certain distances between these two lines sufficiently near to each other that the workman may practically work down the whole surface of the mold-board. I have found that by lifting the form on lines at distances of about an inch apart the workman can finish the residue of the surface with sufficient accuracy for all practical purposes; but after the location of certain lines at this distance apart, by the same rules these divisions can be multiplied to an indefinite extent.

Referring to diagram Fig. 6, the diagonal lines $Ff^{12}$ and $gf^4$ will be found. On the line $Ee$, I divide the space between the point of its intersection with the arc $k$ and the line $Mm$ into eight equal parts, and from each of the points of division I draw lines parallel with the base to intersect the arc $k$, and the e points of intersection I mark from 4 to 12, as the divisions are marked on the arc $h$ of the second division; and I then draw diagonal lines $f^5 f^6 f^7 f^8 f^9 f^{10} f^{11}$, passing through points of the divisions correspondingly numbered on the arc $h$ of the second division and on the arc $k$ of third division, and project them until they intersect the first division. On Fig. 5 I measure the height from the base where the line $Ff^{12}$ intersects the line $Dd$ or plane of the first division, and transfer that distance or height on the line $Aa$ of diagram Fig. 6, measuring from the base, which will be where the line $Ff^{12}$ of that diagram intersects the line $Aa$ or plane of the landside. In like manner on Fig. 5 I measure the distance or height from the base where the line $gf^4$ intersects the line $Dd$ or plane of the first division, and transfer that height onto the line $Aa$ of Fig. 6, from the base, and draw a line, $Nn$, parallel with the base until the said line intersects the diagonal line $gf^4$, and this point of intersection will be found to be at the same distance from the line $Aa$, Fig. 1, as the point of intersection of the said line $gf^4$; with the line $Dd$ or plane of the first division is distant from the plane of the landside, so that these several points of intersection on these several figures prove each other. I then strike an arc, $o$, of the same radius as the arc $k$, (forty-eight inches,) so that it shall intersect the point where the line $Ff^{12}$ intersects the line $Aa$, and also the point where the line $Nn$ intersects the diagonal line $gf^4$, and the distance between the lines $Ff^{12}$ and $Nn$ where these lines cut the said line $Aa$, I divide into eight equal parts, and from these divisions I draw lines parallel with the base, and these several lines will be found to cut the several diagonal lines, $f^5$ to $f^{11}$, inclusive, where they intersect the arc $o$, which points of intersection on the said arc $o$ are numbered from 5 to 11, as the corresponding divisions are marked on the arcs $h$ and $k$ of the second and third divisions.

From the several points of intersection on the arcs $o$ and $k$ of the first and third divisions, numbered from 4 to 12, inclusive, I draw lines perpendicular to the base and cutting the said base-lines; and the divisions thus obtained on the base-line of Fig. 6 I then transfer to Fig. 4, transferring the divisions obtained from the arc $o$ onto the line $Dd$ or first division, and beginning with number 4, which will be found to coincide with the diagonal line $gf^4$ and ending with number 12, which in both figures is the point of intersection of the diagonal line $Ff^{12}$ with the line $Aa$ or plane of the landside; and the divisions obtained from the arc $k$ or third division I in like manner transfer to the line $Ee$ or third division on Fig. 4, measuring on both figures from the line $Aa$ or plane of the landside, and the division number 4 will be found to coincide with the diagonal line $gf^4$ and the division numbered 12 with the diagonal line $Ff^{12}$ or upper edge of the working-surface of the mold-board. From the several points of division thus transferred on the lines $Dd$ and $Ee$ of Fig. 4, except the two numbered 4 and 12, on which the lines $Ff^{12}$ and $gf^4$ were previously drawn, I draw straight lines diagonal to the plane of the landside, which lines are marked $Ff^5$ to 11, inclusive; and where these several lines cut the line $Bb$ or plane of the second division the distance of each from the line $Aa$ or plane of the landside will be found on measurement to be equal to the distance of the correspondingly-numbered divisions on the arc $h$ of the second division from the line $Aa$ on diagram Fig. 6. In this way the inclination which the surface of the mold-board makes to the plane of the landside along the several lines, $gf^4$ to $Ff^{12}$, is obtained, defined, and proved, and it only remains to obtain, define, and prove the inclination of the said surface to the base of the plow along the said lines. This is done by transferring the divisions on the arcs $o$ and $k$ as projected by lines parallel with the base to the lines $Aa$ and $Ee$. Those on the line $Aa$ of Fig. 6 I transfer to the line $Dd$ of Fig. 5, measuring both figures from the base, and those on line $Ee$ of Fig. 6 to the corresponding line, $Ee$, of Fig. 5, measuring both figures from the base. The surface of the mold-board having been defined at the first, second, and third divisions, and along the several inclined lines from $gf^4$ to $Ff^{12}$, the workman will be enabled to make the surface between conform properly to the surface at these lines; but it will be obvious that the number of graduations on the arc $h$ of the second division instead of being made one inch apart, which I have found to be sufficient in practice, may be made as much less than an inch as the constructor may desire. As the form below the line $gf^4$ runs into the cutting-edge of the share it is left to the judgment of the constructor to determine the form of that part, as also the form or extent of the surface above the line of the upper working-edge of the mold-board, and the extent of the wing back of the second division, as it may be cut short of or extended back of the third divison, as also with the amount to be cut away along the lower edge of the wing back of the heel of the mold-board.

The drawings represent that form of the auxiliary parts which I prefer, but to which I do not wish to be understood as confining myself. The points where the several lines, $g f^4$ to $F f^{12}$, intersect the vertical plane of the landside, and marked $p^4$ to $p^{12}$ in Fig. 5, will give the general configuration of the line of the forward cutting edge, termed the "shin" of the plow.

The mode of procedure which I have adopted for working out the block of wood to the form required for making a pattern is as follows: I make an instrument or gage, Fig. 7, consisting of a plate, $q$, on a base, $r$, at right angles therewith, and one edge of the plate $q$ is cut to a form fitting the concavity of the arc $h$, Fig. 6, when the base $r$ of the said instrument is in the plane of the base of the said Fig. 6, and hence this curved edge will be the proper gage to determine when the face of the block, Figs. 2 and 3, is cut to the required concavity in the plane of the second division. I transfer on the face of the plate $q$ of the said gage, up to the curved edge thereof, the graduations or divisions of the arc $h$ Fig. 6. When the plane of the said gage is in the plane of the second division B $b$ and the plane of its base in the plane of the base of the block, and the angle $c$ at twelve inches from the face A $a$ of the said block or vertical plane of the landside, then the workman has obtained the required concavity of the face of the block in the plane of the second division, and marks thereon the divisions on the face of the gage to locate the several divisions numbered from 1 to 12 of Fig 6. I then make another gage, Fig. 8, in like manner, with the curved edge thereof fitted to the concavity of the arc $k$, Fig. 6, while the base of the gage is in the plane of the base of Fig. 6, and on the face of this gage I transfer the graduations of the arc $k$. I then cut into the face of the block in the direction of the plane of the third division until the curved edge of the said gage touches every part of the said surface and its vertical edge E $e$ is at the same distance from the plane of the block which represents the landside as the line E $e$, Fig. 6, is from the line A $a$ of the said figure, and the base of the gage is in the plane of the base of the block. This determines the required concavity of the block in the plane of the third division and at the required distance from the landside; and I then transfer on the surface of the block the graduations on the edge of the gage numbered from 4 to 12. I then make a third gage, Fig. 9, in like manner as the other two, to correspond in every respect with the arc $o$, Fig. 6, as the other gages were made to correspond with the arcs $h$ and $k$, and I cut and mark the surface of the block in the plane of the first division in the same manner as it was cut and marked by the other gages in the plane of the second and third divisions, and bearing the same relation to the face of the block which represents the landside that the arc $o$ on Fig. 6 bears to the line A $a$ or plane of the landside.

Having thus cut away the surface of the block to the required concavity in the planes of the first, second, and third divisions, and marked and numbered thereon the several graduations to correspond with the graduations on the arcs $o$, $h$, and $k$ of Fig. 6, I then cut away the surface of the block in the direction of straight lines, so that a straight edge will touch along the entire length of the surface, passing through the graduations correspondingly numbered on the concavity at the three divisions, as shown on Figs. 4 and 5, by the lines $g f^4$ and $F f^5$ to $F f^{12}$, inclusive, and then work off the remaining portions of the surface between and beyond these lines to a form which will correspond therewith.

I have thus described the manner in which I produce the form of the surface of a pattern from which to mold and cast the mold-board for a greensward flat-furrow plow; but I do not wish to be understood as limiting myself to plows of such proportions, as my invention is equally applicable to plows of different proportions—as, for instance, for a stubble or old-ground plow. Instead of locating the first and third divisions each at a distance from the second division equal to the width of the plow at the heel of the mold-board, or, what is the same thing, equal to the width of the furrow intended to be cut, those distances are reduced to ten-twelfths, so that for such a plow, intended for a twelve-inch furrow, the first and third divisions will be each ten inches from the second division; and as the inclination of the upper edge of the working-surface relatively to the plane of the landside depends upon the parallelogram formed by the line of the landside, the lines of the first and second divisions, and a fourth line parallel with the line of the landside and passing through the heel of the mold-board, it necessarily follows that as the first and third divisions are made to approach the second division in a given breadth of plow, the angle of the upper edge of the working-surface to the landside will increase, and vice versa; and therefore by approaching the divisions the plow will be more abrupt or "blunt," as it is termed, and as these divisions are separated the plow produced will be more gradual or acute; but nevertheless it will be seen that as the length is reduced relatively to the breadth all the proportions will vary in the same ratio, because as the distance between the planes of the three divisions is reduced the point of the plow is brought nearer to the heel, for the reason that the distance of the point from the plane of the second division is determined by the relations of the breadth of the plow at the second division with the distance between the first and the second divisions; and in turn these proportions determine not only the inclination of the line $g f^4$ to the base and the landside, but also the inclination of the upper edge of the working-surface to the base and to the landside, for it will be observed that as the three divisions are made to approach each other the angle of the diagonal line F $f$, diagram Fig. 1, will increase at the same time the point is made to approach the heel which increases the angle of the line $g f^4$ to the base and to the landside, so that all the lines composing the figure are changed in proportion, for as the inclination of the line $g f^4$ is changed the point where the line $g f^4$ passes through the plane of the third division is changed, as also the distance of the line of the upper edge of the working-surface at the third division, from which all the other straight lines which intersect the arc $h$ at the second division receive the angle which they form both with the base and the landside.

In this way every variety in the proportions may be given without changing the characteristic form which I have invented, and which distinguishes my invention from all other things before known. After the working-surface of the mold-board has been produced the landside can be cut away to any angle with the vertical plane which may be desired to make a plow of any desired inclination; but in determining the configuration of the working-surface it is desirable to have the face of the block on the landside present a plane perpendicular to the base.

Thus it will be seen that the characteristic form of the working-surface of the mold-board of plows produced according to my said invention is determined by the series of straight lines and arcs of circles, as described, the said arcs of circles being produced on the cross-vertical planes of the first, second, and third divisions, and at distances from each other depending upon the intended proportions of the base of the plow, as described, the radius of the said arcs which determine the concavity of the said surface gradually decreasing forward and back of the second division located at the heel of the mold-board, so as to be of double the radius at the first and third divisions, obtained and determined as described, and the said straight lines being inclined to the base and to the vertical plane of the landside, the inclination which each bears to the vertical plane of the landside being made to depend upon the relative angles which the chords of the arcs at the three divisions bear to each other and to the plane of the base, and the inclination of the said straight lines to the plane of the base being made to depend upon the distance of the first and third divisions from the second division relatively to the breadth of the plow at the heel of the mold-board or plane of the second division, as described, by reason of which characteristic form of the gradually-increasing concavity from the point to the heel of the mold-board the furrow-slice as it is cut, lifted, and turned up is gradually disintegrated, and by the gradual decrease of the concavity from the heel back, as the furrow-slice is being turned over and laid, it is closed up again and laid smooth, while at the same time the inclination of the series of straight lines to the plane of the base and to the plane of the land side is such as to lift and turn over the furrow-slice with the least resistance and with the least violence.

I do not wish to be understood as making claim to the formula or rule by which the form of the working-surface of the mold-board is determined or obtained, as I have only described such rule or formula as a mode of determining and defining the form which does constitute my said invention, that it may be distinguished from all other forms of mold-boards known prior to my said invention.

What I do claim as my invention, and desire to secure by Letters Patent, is—

The form of the working-surface of the mold-board of plows, substantially such as described, and composed or combined of the several characteristic features above specified.

SAMUEL A. KNOX.

Witnesses:
  GEO. HOBBS,
  WM. GREENLEAF.